Aug. 24, 1954  C. C. MINTER  2,687,036
THERMAL CONDUCTIVITY BRIDGE-BLOCK
Filed Nov. 20, 1950

INVENTOR
CLARKE C. MINTER.
BY
ATTORNEY

Patented Aug. 24, 1954

2,687,036

UNITED STATES PATENT OFFICE 2,687,036

THERMAL CONDUCTIVITY BRIDGE-BLOCK

Clarke C. Minter, Washington, D. C., assignor to Minter Instrument Corporation, New York, N. Y., a corporation of New York Application November 20, 1950, Serial No. 196,580

5 Claims. (Cl. 73—27)

The present invention relates to apparatus for measuring the thermal conductivity of gas mixtures and more especially to a novel cell-block for supporting the various cells in such manner that any temperature changes due to the cooling effect of the sample gas does not result in an erroneous reading.

Apparatus of this type is known to the art using a thermal conductivity bridge and wherein the analyzing cells are connected on one side of a Wheatstone bridge and positioned together in the cell-block as close as possible to the passage for the sample gas, so as to decrease to a minimum the time lag in indicating a change in composition of the mixture. Such arrangement, however, has been unsatisfactory because it has been found that the moving stream of cool sample gas will remove more heat from the side of the cell-block containing the analyzing cells thereby cooling the current-heated filaments of these cells more than the filaments of the reference cells, with the result that the Wheatstone bridge becomes unbalanced due to an undesired temperature differential, giving rise to an erroneous reading tending to indicate a change in the gaseous composition of the sample gas.

It is accordingly an object of the present invention to provide a gas analysis apparatus wherein the cell-block is so constructed that the gas passages prevent the moving stream of sample gas from cooling the analyzing cells to a greater extent than the reference cells.

Another object of the present invention is the provision of a novel cell-block for a gas analysis apparatus wherein the gas passages are so arranged that the moving stream of cool sample gas cools the filaments of the analyzing cells and the reference cells to the same extent.

Figure 1:
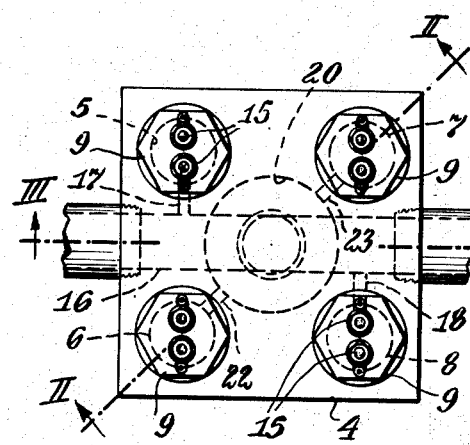
Figure 2:
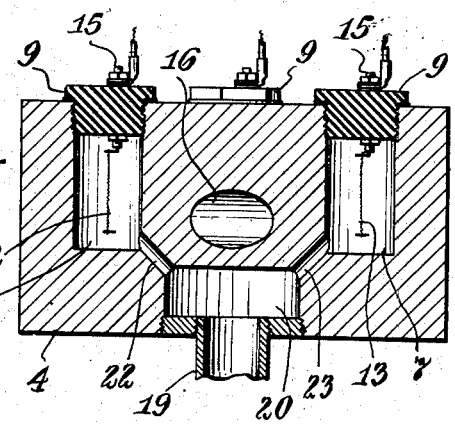
Figure 3:
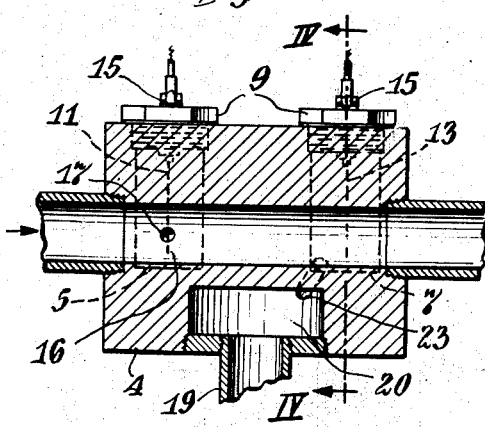
Figure 4:
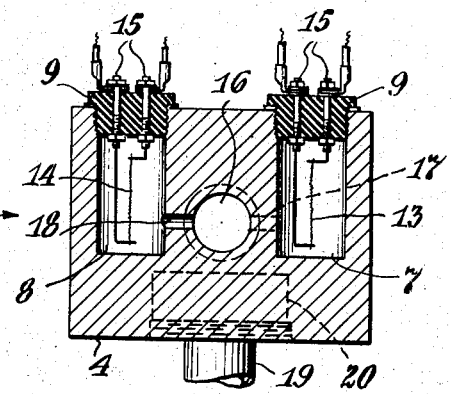
Figure 5:
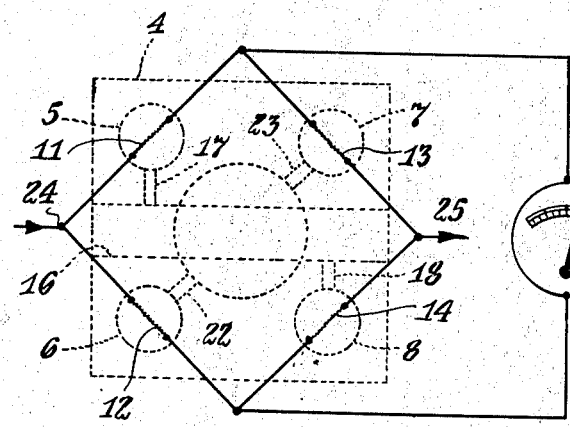

Still further objects of the present invention will become obvious to those skilled in the art by reference to the accompanying drawing wherein:

Figure 1 is a plan view of the cell-block for a gas analysis apparatus in accordance with the present invention, Fig. 2 is a cross-sectional view taken on the line II—II of Fig. 1, Fig. 3 is a cross-sectional view taken on the line III—III of Fig. 1, Fig. 4 is a cross-sectional view taken on the line IV—IV of Fig. 3, and Fig. 5 is a schematic diagram of the electrical circuit arrangement of the cells which form the Wheatstone bridge of the analyzer.

Referring now to the drawing in detail, the cell- or bridge-block 4 as shown is formed of metal, such as brass, copper, lead, or similar material having four holes drilled therein adjacent each corner to form cells 5, 6, 7, and 8. Each cell is closed by a threaded insulated plug 9 formed of fiber, Bakelite, glass, or any other suitable insulating material, with each plug supporting an electrically heated filament 11, 12, 13, and 14 for each respective cell. The filaments are connected to suitable terminals 15 which pass through the insulating plug 9 to enable connection of the filaments in a Wheatstone bridge arrangement, such as shown in Fig. 5 and as will be hereinafter more fully described.

A tube or bore 16, symmetrically placed relative to the cells, passes horizontally through the bridge-block 4 which connects with an intake and exhaust conduit for the movement of a stream of sample gas therethrough which is to be analyzed. A small passageway 17 connects the tube 16 with the analyzing cell 5 and a similar small passageway 18 connects the tube 16 with the other analyzing cell 8, so that gas moving through the tube 16 will diffuse into both analyzing cells 5 and 8. A conduit 19 connects with a chamber 20 within the bridge-block 4 which contains the stagnant reference gas and a small passageway 22 connects the reference cell 6 with the chamber and in a similar manner a small passageway 23 connects the reference cell 7 with chamber 20, so that the stagnant reference gas thus diffuses into both reference cells 6 and 7.

By reference now to Fig. 5, it will be noted that the analyzing cells 5 and 8 with their respective current-heated filaments 11 and 14 are on diagonals of the Wheatstone bridge and similarly the reference cells 6 and 7 are on the remaining diagonals of such bridge. Current flowing to the input terminals 24 and 25 thus passes through the Wheatstone bridge, and any unbalancing thereof is indicated on the galvanometer 26. From Fig. 5 it is obvious that, electrically speaking, the reference and analyzing cells are symmetrically placed relative to each other and from the remaining figures it is equally obvious that, physically speaking, the cells are likewise symmetrically disposed relative to each other since the analyzing cells 5 and 8 are on one diagonal, while the reference cells 6 and 7 are on the other diagonal.

From the foregoing it can be readily seen that, due to the symmetrical positioning of the tube 16 through which the sample gas passes, any cooling effect produced by such moving stream will have the same effect on the filaments 11 and 12 of cells 5 and 6 and likewise the same effect on the filaments 13 and 14 of the cells 7 and 8. The cooling of the bridge elements by the sample gas is thus uniform and symmetrical and the bridge does not become unbalanced due to any temperature differential which would otherwise cause an unbalancing of the bridge resulting in an erroneous reading on the meter 26. This might be better appreciated if it be assumed for the moment that cells 5 and 6 were connected to the symmetrically disposed tube 16 and the cells 7 and 8 were connected to the reference chamber 20, then the cooling effect of the moving stream of sample gas would be unsymmetrical electrically because of the cooling effect on the current heated bridge elements. Since the sample gas flows through the tube 16 from left to right, as shown by the arrows, the cooling effect on the filaments 11 and 12 would be greater under the assumed condition as such gas stream is warmed in passing filaments 11 and 12 and would thus have a higher temperature when passing the other filaments 13 and 14 giving rise to the above noted erroneous reading.

It should thus be apparent to those skilled in the art that, by providing a gas analysis apparatus with a bridge-block in which the analyzing cells and the reference cells are diagonally disposed relative to each other, both physically and electrically, the current-heated bridge elements are cooled uniformly and symmetrically by the moving stream of sample gas and the possibility of error due to temperature differential is completely eliminated. Accordingly a comparison of the thermal conductivity of the sample gas with that of a stagnant gas alone is made uninfluenced by temperature variations and any difference is entirely indicative of a difference in composition of the mixture.

Although one specific embodiment of the present invention has been shown and described it is to be understood that still further modifications thereof may be made without departing from the spirit and scope of the appended claims.

I claim:

1. A bridge-block for thermal conductivity gas analysis apparatus comprising a block having four similar cells symmetrically spaced along diagonals in said block, two independent gas passages in said block, and means for connecting each pair of diagonally spaced cells to one of said two independent gas passages each of which is symmetrically spaced in said block with respect to all four cells.

2. A bridge-block as described in claim 1 having a temperature-responsive current-heated filament mounted axially in each of said four similar cells.

3. A bridge-block as described in claim 2 in which said temperature-responsive current-heated filaments are connected in the form of a Wheatstone bridge.

4. A bridge-block as described in claim 3, in which one pair of said diagonally disposed cells form two reference cells and have their respective temperature-responsive current-heated filaments connected on parallel diagonals of the Wheatstone bridge and the remaining pair of diagonally disposed cells form two analyzing cells and have their respective temperature-responsive current-heated filaments connected on the opposite parallel diagonals of the Wheatstone bridge.

5. A bridge-block as described in claim 4, in which each of said four similar cells is formed by an opening in said block that is closed by a mounting means for each one of said temperature-responsive current-heated filaments and one of said two independent gas passages comprises a tube extending through said block for the passage of gas to be analyzed with such sample gas diffusing through the connecting means into one pair of said diagonally disposed cells, and the other of said two independent gas passages containing a source of stagnant reference gas which diffuses through the connecting means into the remaining diagonally disposed cells.

References Cited in the file of this patent

UNITED STATES PATENTS

| Number | Name | Date |
| --- | --- | --- |
| 2,329,840 | Keinath | Sept. 21, 1943 |
| 2,512,857 | Gow | June 27, 1950 |
| 2,591,195 | Picciano | Apr. 1, 1952 |